US012653643B2

(12) United States Patent
Phan et al.

(10) Patent No.: US 12,653,643 B2
(45) Date of Patent: Jun. 16, 2026

(54) ORTHODONTIC APPLIANCES AND MATERIALS

(71) Applicant: Smylio Inc., Fremont, CA (US)

(72) Inventors: Loc Phan, Santa Clara, CA (US); Huong Dinh, San Jose, CA (US)

(73) Assignee: Smylio Inc., Fremont, CA (US)

( * ) Notice: Subject to any disclaimer, the term of this patent is extended or adjusted under 35 U.S.C. 154(b) by 451 days.

(21) Appl. No.: 16/820,663

(22) Filed: Mar. 16, 2020

(65) Prior Publication Data

US 2021/0137642 A1     May 13, 2021

Related U.S. Application Data

(60) Provisional application No. 62/933,977, filed on Nov. 11, 2019.

(51) Int. Cl.
*B29C 51/14*          (2006.01)
*A61C 7/08*          (2006.01)
(Continued)

(52) U.S. Cl.
CPC ............... *A61C 7/08* (2013.01); *B29C 51/14* (2013.01); *B32B 27/08* (2013.01); *B32B 27/32* (2013.01); *B32B 27/36* (2013.01); *B32B 27/40* (2013.01); *A61C 2201/00* (2013.01); *B29K 2023/065* (2013.01); *B29K 2067/003* (2013.01); *B29K 2075/00* (2013.01); *B29K 2995/0025* (2013.01);
(Continued)

(58) Field of Classification Search
CPC ....... A61C 7/08; A61C 2201/00; B29C 51/14; B29C 51/00; B32B 27/08; B32B 27/32;

B32B 27/36; B32B 27/40; B32B 2307/41; B32B 2307/412; B32B 2307/414; B32B 2307/704; B29K 2023/065; B29K 2067/003; B29K 2075/00; B29K 2995/0025; B29K 2995/0026; B29K 2995/0029

See application file for complete search history.

(56) References Cited

U.S. PATENT DOCUMENTS 5,975,893 A     11/1999   Chishti et al.
6,390,812 B1     5/2002   Chishti et al.
(Continued)

FOREIGN PATENT DOCUMENTS

CN          101006940 A     8/2007
CN          106572894 A     4/2017
(Continued)

OTHER PUBLICATIONS

Bodo, K. International Search Report & Written Opinion for PCT/US/2020/023029, Aug. 31, 2020.
(Continued)

*Primary Examiner* — Alison L Hindenlang
*Assistant Examiner* — Shibin Liang
(74) *Attorney, Agent, or Firm* — MT HUNT LAW; Marcus T. Hunt

(57)          ABSTRACT

An orthodontic appliance shaped to receive teeth. The orthodontic appliance can be constructed from a laminate structure with a outer transparent layer and an inner translucent layer. The translucent layer can scatter light to decrease a relative degree or perceived gloss to the human eye, and hence provide a more natural appearance to the orthodontic appliance.

19 Claims, 3 Drawing Sheets

(51) Int. Cl.

| | | |
|---|---|---|
| *B32B 27/08* | (2006.01) | |
| *B32B 27/32* | (2006.01) | |
| *B32B 27/36* | (2006.01) | |
| *B32B 27/40* | (2006.01) | |
| B29K 23/00 | (2006.01) | |
| B29K 67/00 | (2006.01) | |
| B29K 75/00 | (2006.01) | |

(52) U.S. Cl.
CPC ................ *B29K 2995/0026* (2013.01); *B29K 2995/0029* (2013.01); *B29K 2995/0041* (2013.01); *B32B 2307/41* (2013.01); *B32B 2307/412* (2013.01); *B32B 2307/414* (2013.01); *B32B 2307/704* (2013.01)

(56) References Cited

U.S. PATENT DOCUMENTS

| | | | |
|---|---|---|---|
| 6,450,807 | B1 | 9/2002 | Chishti et al. |
| 6,454,565 | B2 | 9/2002 | Phan et al. |
| 7,037,108 | B2 | 5/2006 | Chishti et al. |
| 7,131,830 | B2 | 11/2006 | Kobayashi et al. |
| 7,131,836 | B1 | 11/2006 | Kesling |
| 8,235,713 | B2 | 8/2012 | Phan et al. |
| 9,655,693 | B2 | 5/2017 | Li et al. |
| 9,872,743 | B2 | 1/2018 | Kim |
| 10,549,511 | B2 | 2/2020 | Stewart |
| 10,959,810 | B2 | 3/2021 | Li et al. |
| 11,154,382 | B2 | 10/2021 | Kopelman et al. |
| 11,317,992 | B2 | 5/2022 | Phan |
| 11,642,198 | B2 | 5/2023 | Kopelman et al. |
| 2001/0006770 | A1 | 7/2001 | Chishti et al. |
| 2002/0119423 | A1 | 8/2002 | Chishti et al. |
| 2002/0192617 | A1 | 12/2002 | Phan et al. |
| 2004/0026827 | A1* | 2/2004 | Dairanieh ............... B29C 49/64 |
| | | | 264/288.4 |
| 2004/0152032 | A1 | 8/2004 | Bergersen |
| 2006/0078688 | A1 | 4/2006 | DeSimone et al. |
| 2008/0206715 | A1* | 8/2008 | Kawamoto ............ A61C 7/146 |
| | | | 433/226 |
| 2009/0133260 | A1 | 5/2009 | Durbin et al. |
| 2009/0311511 | A1 | 12/2009 | Obuchi et al. |
| 2010/0129763 | A1 | 5/2010 | Kuo |
| 2011/0247214 | A1 | 10/2011 | Huge |
| 2012/0254781 | A1 | 10/2012 | Larsen et al. |
| 2015/0366637 | A1 | 12/2015 | Kopelman et al. |
| 2015/0366638 | A1 | 12/2015 | Kopelman et al. |
| 2016/0092041 | A1 | 3/2016 | Pickens |
| 2016/0157962 | A1 | 6/2016 | Kim |
| 2017/0112594 | A1 | 4/2017 | Hilliard |
| 2017/0239017 | A1 | 8/2017 | Kim |
| 2017/0239018 | A1 | 8/2017 | Kim |
| 2018/0235731 | A1 | 8/2018 | Hung |
| 2018/0333226 | A1 | 11/2018 | Tsai et al. |
| 2018/0368961 | A1 | 12/2018 | Shanjani et al. |
| 2019/0105881 | A1* | 4/2019 | Stewart ................... B32B 7/027 |
| 2019/0239987 | A1 | 8/2019 | Jones et al. |
| 2020/0015937 | A1* | 1/2020 | Stewart ................... B32B 7/022 |
| 2020/0147856 | A1* | 5/2020 | Culp ........................ B29C 51/24 |
| 2020/0237478 | A1* | 7/2020 | Chang ..................... B32B 27/32 |
| 2021/0078357 | A1 | 3/2021 | Venkatasanthanam et al. |
| 2021/0369422 | A1* | 12/2021 | McAuley ................ B32B 7/027 |
| 2022/0234779 | A1* | 7/2022 | Spohn ................. B65D 1/0207 |

FOREIGN PATENT DOCUMENTS

| | | | | |
|---|---|---|---|---|
| CN | 106572895 | A | 4/2017 | |
| CN | 107518953 | A | 12/2017 | |
| CN | 107847299 | A | 3/2018 | |
| CN | 110215300 | A | 9/2019 | |
| CN | 108451658 | B | 10/2020 | |
| CN | 106029001 | B | 8/2022 | |
| EP | 1570803 | A2 | 9/2005 | |
| EP | 1905380 | B1 | 1/2009 | |
| JP | 2018134401 | A | 8/2018 | |
| KR | 101769332 | B1 | 8/2017 | |
| RU | 2610911 | C1 | 2/2017 | |
| WO | 2005065567 | A1 | 7/2005 | |
| WO | 2005065568 | A1 | 7/2005 | |
| WO | 2017007962 | A1 | 1/2017 | |
| WO | 2019071063 | * | 4/2019 | ............. B32B 27/08 |

OTHER PUBLICATIONS

Scheu, Biostar Operating Manual, DE/GB/FR/IT/ES/1.000/06/19 G REF PM 0113.01, downloaded from http://products.scheu-dental.com/documents/5000/1-DOC/0/0/0/0/2/BIOSTAR_SCAN_BA_PM0113_Original_2977.pdf on Apr. 16, 2020.

Scheu, Application booklet for the pressure moulding technique, GB 2.000/07/19 G REF 0111.02, downloaded from https://www.scheu-dental.com/fileadmin/SCHEU-DENTAL/Downloads/06_Sonstiges/BIO_MINI_BRO_0111_GB.pd on Apr. 16, 2020.

Erkodent, Thermoforming, Stzt-EN-03-2020_web, Apr. 2020, downloaded from https://www.erkodent.de/wp-content/documents/products/tztbrosch_EN.pdf on Apr. 16, 2020.

Erkodent, Erkoform-3D+ Instructions, BA-Erkoform-3d+-anl-EN-04-04-2019, downloaded from https://www.erkodent.de/wp-content/documents/products/3d+_anl_einzel_EN.pdf on Apr. 16, 2020.

Chadwick et al., "The perception of gloss: A review." Vision Research, vol. 109, Part B, Apr. 2015, pp. 221-235.

Luo et al., "Assessing Gloss of Tooth using Digital Imaging." Conference on Colour in Graphics, Imaging, and Vision, CGIV 2008 Final Program and Proceedings, pp. 307-311.

Kerner, Bodo; International Search Report & Written Opinion for PCT/US/2020/060066; Feb. 17, 2021.

Ardhuin, Helene, International Search Report & Written Opinion for PCT/US/2020/015490, May 13, 2020.

* cited by examiner

ORTHODONTIC APPLIANCES AND MATERIALS

CROSS-REFERENCE TO RELATED APPLICATIONS

This application claims the benefit of U.S. Provisional Application No. 62/933,977, filed on Nov. 11, 2019, the entirety of which is incorporated by reference.

BACKGROUND

An objective of orthodontics is to move a patient's teeth to positions where function and/or aesthetics are optimized. Traditionally, appliances such as braces are applied to a patient's teeth by a treating practitioner and the set of braces exerts continual force on the teeth and gradually urges them toward their intended positions. Over time and with a series of clinical visits and reactive adjustments to the braces by the practitioner, the appliances to move the teeth toward their final destination.

More recently, alternatives to conventional orthodontic treatment with traditional affixed appliances (e.g., braces) have become available. For example, systems including a series of molded plastic aligners have become commercially available from Align Technology, Inc., San Jose, Calif, under the trade name Invisalign® System. The Invisalign® System is described in numerous patents and patent applications assigned to Align Technology, Inc. including, for example in U.S. Pat. Nos. 6,450,807, and 5,975,893. Such aligners are commonly called "clear" aligners due to a transparent plastic construction. Similarly constructed (i.e., thicker) clear retainers (e.g. ESSIX retainers) also exist as a post-procedure option for orthodontic patients.

Clear aligners and retainers are popular among patients over patients for ease of use and aesthetic reasons, as the clear plastic touted as being much less noticeable by others. While clear aligners and retainers may be more aesthetically acceptable to many, such devices are not "invisible." The devices add an unnatural gloss to the teeth due to light interactions with the transparent plastic. For some patients, this gloss effect reduces appliance wear compliance.

SUMMARY OF THE INVENTION

Embodiments of the invention relate to orthodontic appliances and materials as summarized in the following paragraphs. Some embodiments relate to orthodontic appliances and materials that have a less noticeable gloss and a more natural oral appearance. In some embodiments, an appliance can include a white translucent or opaque layer of material covered by a transparent layer of material.

Some embodiments related to an orthodontic appliance. The orthodontic appliance can be formed from a laminate material shaped to fit over teeth. The laminate material can include a first layer having a transparent material, a second layer having an opaque or translucent material; and a third layer also including the transparent material. The second layer can be between the first and third layer.

In some embodiments, the first and third layer can include at least a portion of polyethylene terephthalate glycol-modified (PETG).

In some embodiments, the second layer can be a translucent material and the second layer can be at least somewhat crystalized to provide a relative degree of translucency.

In some embodiments, the second layer can include at least a portion of a polyurethane.

In some embodiments, the second layer can be at least somewhat crystalized to provide a relative degree of translucency.

In some embodiments, the second layer can be decrystallized during formation of the orthodontic appliance to determine a degree of translucency for the second layer.

In some embodiments, the degree of translucency of the second layer is dependent on how long and/or the amount of heat is applied to the laminate material during thermoforming.

In some embodiments, the second layer can include at least a portion of a thermoplastic elastomer, such as a thermoplastic copolyester, In some embodiments, the second layer can include at least a portion of a maleic anhydride grafted PE (HDPE).

In some embodiments, the second layer can include at least a portion of a reactive terpolymer.

In some embodiments, the laminate material can be 0.025-0.045 inches thick.

Some embodiments relate to an orthodontic appliance material that can be a laminate 0.025-0.045 inches thick and can have a translucent or opaque layer and at least one transparent layer.

In some embodiments, the orthodontic appliance material can include a first transparent layer and second transparent layer, and the translucent layer can be between the first and second transparent layer.

In some embodiments, the orthodontic appliance material can be sized to fit commercially available orthodontic appliance device.

In some embodiments the first transparent layer and second transparent layer can each be a transparent copolyester and the translucent or opaque layer can be a thermoplastic copolyester.

In some embodiments, the first transparent layer and second transparent layer each consist of a transparent polyethylene terephthalate glycol-modified (PETG) and the translucent or opaque layer consists of a thermoplastic copolyester (TPC/TPE-E).

Some embodiments relate to an orthodontic appliance material having a polymer laminate 0.025-0.040 inches thick and only including a single translucent layer between two transparent layers.

Some embodiments relate to a method for forming an orthodontic appliance. A laminate material can be placed into an orthodontic appliance thermoforming device. The laminate material can include a first layer of a transparent material; a second layer of a crystallized thermoplastic elastomer; and a third layer of the transparent material. The second layer can be between the first and third layer. The laminate material can be thermoformed into the orthodontic appliance according to pressure, heating, and time settings of the orthodontic appliance thermoforming device. At least the heating and time settings can be selected to at least partially decrystallize the thermoplastic elastomer of the second layer so as to make the second layer relatively more transparent.

In some embodiments, at least the heating and time settings are selected to at least partially decrystallize the thermoplastic elastomer of the second layer so to become translucent.

In some embodiments, increasing an amount of heat energy applied to the laminate material and/or increasing the amount of time the laminate material is heated can cause the second layer to have greater relative transparency.

In some embodiments, the heating settings can include a setting of 220° C. (427° F.).

In some embodiments, the time setting can include a heating time of 30-60 seconds.

In some embodiments, increasing the amount of heat applied to the laminate material and/or increasing the amount of time the laminate material is thermoformed can cause the second layer to increase in an amount of translucency.

BRIEF DESCRIPTION OF THE DRAWINGS

For a better understanding of at least certain embodiments, reference will be made to the following Detailed Description, which is to be read in conjunction with the accompanying drawings.

Figure 1:
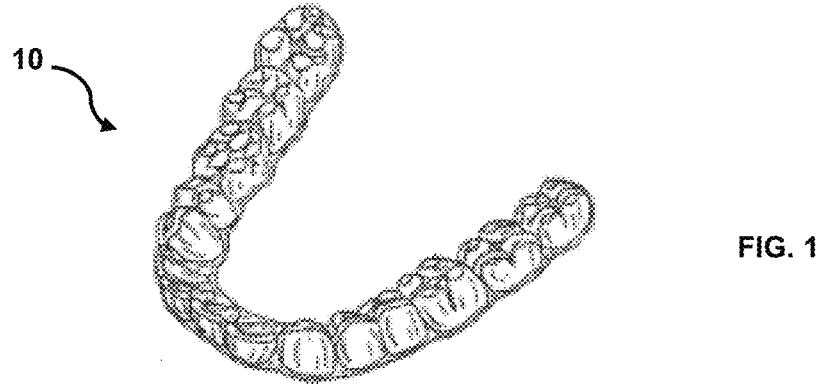
FIG. 1 is a perspective view of an orthodontic appliance, according to some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Embodiments are disclosed that relate to orthodontic appliances constructed from multiple shells for the purpose of maximizing working elasticity, which is defined herein as the capability of an orthodontic appliance to elastically deform to attach to an initial location of the teeth.

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

FIG. 1 illustrates orthodontic appliance 10, which can be worn by a patient in order to achieve an incremental repositioning of individual teeth or for the purpose of retaining position of moved teeth after completion of an orthodontic treatment (i.e., a "retainer"). In some embodiments, orthodontic appliance 10 can be formed from a laminate of suitable layers of polymeric material. Orthodontic appliance 10 can fit over all teeth present in an upper or lower jaw, or less than all of the teeth.

In some embodiments, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Basic methods for determining an orthodontic treatment plan using a series of incremented appliances as well as instructions for molding orthodontic appliances are well known, and, for example, are described in U.S. Pat. Nos. 6,450,807, and 5,975,893, which are incorporated by reference herein, but only to an extent that those references do not contradict the newer teachings disclosed herein.

An appliance can be designed and/or provided as part of a set of a plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The orthodontic appliances can be generated all at the same stage or in sets or batches, e.g., at the beginning of a stage of the treatment, and the patient wears each appliance until the pressure of each appliance on the teeth can no longer be felt or has resulted in the maximum amount of expressed tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The orthodontic appliances are generally not affixed to the teeth and the patient may place and replace the appliances at any time during the procedure (e.g., patient-removable appliances).

Figure 2A:
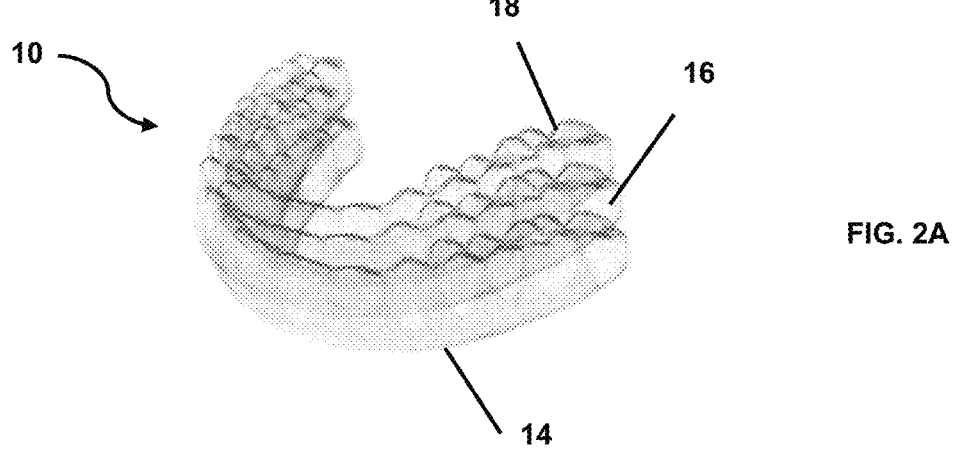
FIG. 2A is an exploded view of an orthodontic appliance, according to some embodiments.

FIG. 2A shows an exploded view of orthodontic appliance 10. The orthodontic appliance 10 can include a first layer 14 having a teeth engaging surface, a second layer 16 over the first layer and a third layer 18 having an outer surface that is exposed to the oral cavity. In some embodiments, one or more additional layers can be located between the first layer 14 and the second layer 16 and/or between second layer 16 and third layer 18.

In some embodiments, third layer 18 is not included and therefore only first layer 14 and second layer 16 are included, with second layer 16 being the tooth engaging layer.

Figure 2B:
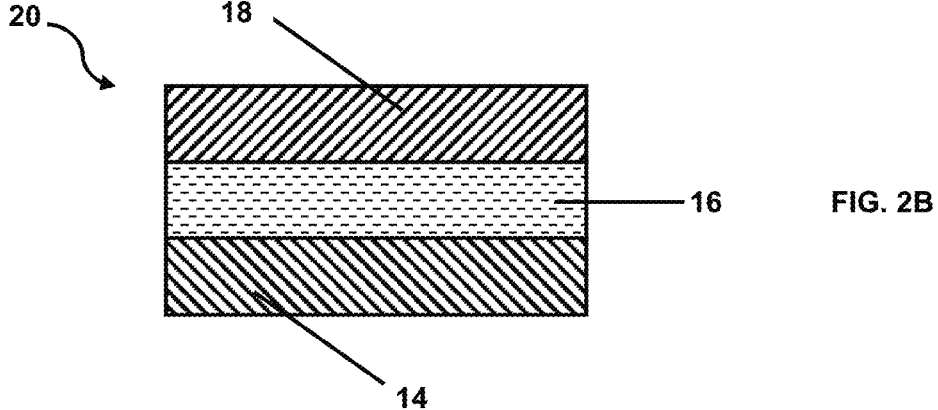
FIG. 2B is a cross-section of a laminate material, according to some embodiments.

While the orthodontic appliance 10 is shown in an exploded view for the purpose of better understanding, the layers of the orthodontic appliance 10 are intended to be of a single sheet of laminate material. A cross-section of laminate material 20 is shown at FIG. 2B. Laminate material 20 can be formed as a co-extruded or co-laminated sheet.

Scientific theory of human perception of gloss is complex and evolving. One study found that six types of perceived gloss, i.e., gloss perceptions, exist: 1. specular gloss (i.e., perceived shininess, perceived brilliance of highlights); 2. Sheen at grazing angles, which is the perceived gloss at grazing angles of otherwise matte surfaces; 3. Contrast gloss, which is identified by contrasts between specularities and the rest of a surface (i.e., observed contrast between specular highlights and otherwise diffusely reflecting surface areas); 4. Haze—this is the presence of a hazy or milky appearance adjacent to reflected highlights (e.g. haze surrounding a reflected highlight on a brushed metal surface); 5. Distinctness-of-reflected-image gloss—(i.e., the perceived distinctness and sharpness of a pseudoimage seen reflected in a surface); and 6. Absence-of-surface-texture gloss—this is the perceived smoothness of a surface, where non-uniformities of surface texture such as blemishes are not visible. See Chadwick et al., "The perception of gloss: A review." *Vision Research*, Vol. 109, Part B, April 2015, Pages 221-235. See also Luo et al., "Assessing Gloss of Tooth using Digital Imaging." *Conference on Colour in Graphics, Imaging, and Vision*, CGIV 2008 Final Program and Proceedings, pp. 307-311. These publications are incorporated by reference. Accordingly, the presence of different types of gloss perceptions (e.g., brilliance next to haziness within a reflected image) on one surface can result in a high perception of gloss.

Accordingly, aspects that contribute to perceived gloss of a prior art clear aligner can include (among others): gloss perceptions derived from light interaction on the outer surface of the clear material; gloss perceptions derived between light interaction between surfaces of the outer and inner surface of the clear material; gloss perceptions derived from light interaction with trapped saliva between the aligner and the tooth surface; perceptions derived from light interaction with air gaps between the aligner and the tooth surface; and gloss perceptions derived from light interaction at inner and outer surface concavity changes (e.g., inner/outer surface lines at gaps between teeth, gumlines). Put another way, a prior art clear aligner suffers from disparate appearances of high specular gloss, image reflections, shiny surfaces, and dark contrast at the creases/lines between teeth and gumline. The thickness of prior art clear appliances (typically 0.030-0.045 inches (0.75-1.00 mm)) contributes to these issues by increasing reflective distortion.

Light transmittance is the ratio of light intensity passing through a material to the intensity of light received by the specimen. Transmittance is determined by light reflection, absorption, and scattering at the material. A highly transparent material has very little absorptive and scattering properties. An opaque material transmits little to no light because of high scattering and absorptive qualities. Translucent materials have relatively high transmittance ratios, because of negligible absorption, but greatly scatter the transmitted light, resulting in a hazy, white appearance. First layer 14 and third layer 18 can be transparent and second layer 16 can be a translucent material or an opaque or nearly opaque material. The result can be very visually similar (as perceived by the human eye) to the appearance of natural teeth while mitigating gloss perceptions of prior art clear appliances.

Some embodiments of the invention include one or more transparent layers laminated over a translucent layer or an opaque layer. Embodiments of the invention reduce perceived glossiness by: including a thinner transparent layer(s) to reduce reflective gloss perceptions derived from light interaction between internal transparent surfaces; including a thinner transparent layer to reduce gloss perceptions derived from light interaction at inner and outer surface concavity changes; including a laminated internal translucent or opaque layer to eliminate gloss perceptions derived from reflections of teeth surfaces; including a laminated internal translucent layer to eliminate gloss perceptions derived from air gaps between the transparent layer and the translucent or opaque layer; including a laminated translucent layer to eliminate gloss perceptions derived from light interaction with trapped saliva; and including a thinner transparent layer(s) to reduce gloss perceptions derived from light interaction at surface changes (i.e., hard surface lines at gaps between teeth, gumlines).

In some embodiments, one or more of first layer 14, second layer 16, and third layer 18 can have thicknesses ranging from 0.001-0.040 inches (0.025-1.02 mm) thick. In some embodiments, the total thickness of laminate material 20 can range from 0.020-0.050 inches (0.51-1.27 mm). In some embodiments, first layer 14, second layer 16, and/or third layer 18 are 0.015 inches thick prior to forming (e.g. thermoforming) laminate material 20 into appliance 10. In some embodiments, first layer 14, second layer 16, and/or third layer 18 are 0.010 inches thick prior to forming (e.g. thermoforming) laminate material 20 into appliance 10.

In some embodiments, first layer 14, second layer 16, and third layer 18 can be constructed from one or polymers such as a polyester, a copolyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof.

In some embodiments, first layer 14 and/or third layer 18 are each formed from a transparent polymer having low haze, high gloss, high transparency, high regular transmittance, and high total transmittance. For example, for a 0.010 inch (0.25 mm) sample light transmission values can include 0.5-1.5% Haze (ASTM D1003), >80 GU@45° (ASTM D2457), >80% transparency (ASTM D1746), >80% regular transmittance (ASTM D1003 modified), and/or >80% total transmittance (ASTM D1003 Modified)). In some embodiments, a transparent copolyester (e.g., Eastar™ copolyester 6763) can be used having the following properties: (for a 0.010 inch (0.25 mm) sample: 0.8% Haze (ASTM D1003), 108 GU@45° (ASTM D2457), 85% Transparency (ASTM D1746), 89% Regular Transmittance (ASTM D1003 Modified), 91% Total Transmittance (ASTM D1003 Modified)).

In some embodiments, first layer 14 and third layer 18 are each transparent and formed from one or more polymers. In some embodiments, to provide a long service life when oral appliance 10 is a retainer, first layer 14 and/or third layer 18 are selected from materials having high impact resistance. In some embodiments, first layer 14 and third layer 18 are made primarily or entirely from polyethylene terephthalate glycol-modified (PETG). In some embodiments, first layer 14 and/or third layer 18 are made primarily or entirely from polycarbonate. In some embodiments, first layer 14 and/or third layer 18 are made primarily or entirely from polymethylmethacrylate (PMMA).

In some embodiments, first layer 14 and/or third layer 18 is processed to reduce or remove hydrophobic properties (e.g., from PETG) that can induce saliva foaming. In some embodiments, first layer 14 and/or third layer 18 is processed (e.g. rolled) to have a matte outer surface finish to reduce or remove hydrophobic properties. In some embodiments, first layer 14 and/or third layer 18 is processed with an acid or a base to reduce or remove hydrophobic properties. In some embodiments, first layer 14 and/or third layer 18 are covered with coatings or additional layers having hydrophilic properties.

In some embodiments, second layer 16 is formed from one or more translucent polymers, which can provide a hazed white appearance. In some embodiments, second layer 16 is primarily or entirely made of polyurethane, thermoplastic elastomer such as a thermoplastic copolyester (TPC/TPE-E) (e.g. Arnitel® EM400/EM460), maleic anhydride grafted polyethylene (HDPE) (e.g. Westlake Plastics® GB1002), or reactive terpolymer (e.g. Lotader® blends). In some embodiments, second layer 16 can be processed to increase crystallinity, thereby increasing light scattering to reduce transparency, increase translucence and provide a white or milky appearance. In some embodiments, second layer 16 has greater flexibility (e.g., at least 1.5× less flexural modulus) than first layer 14 and/or third layer 18 to provide oral appliance 10 with greater flexibility.

In some embodiments, second layer 16 can be an opaque or nearly opaque material, such as a polymer having a white colorant (e.g. titanium dioxide particles) or a metal foil. In some embodiments, a metal foil can be coated with titanium dioxide to provide a white appearance.

Figure 3:
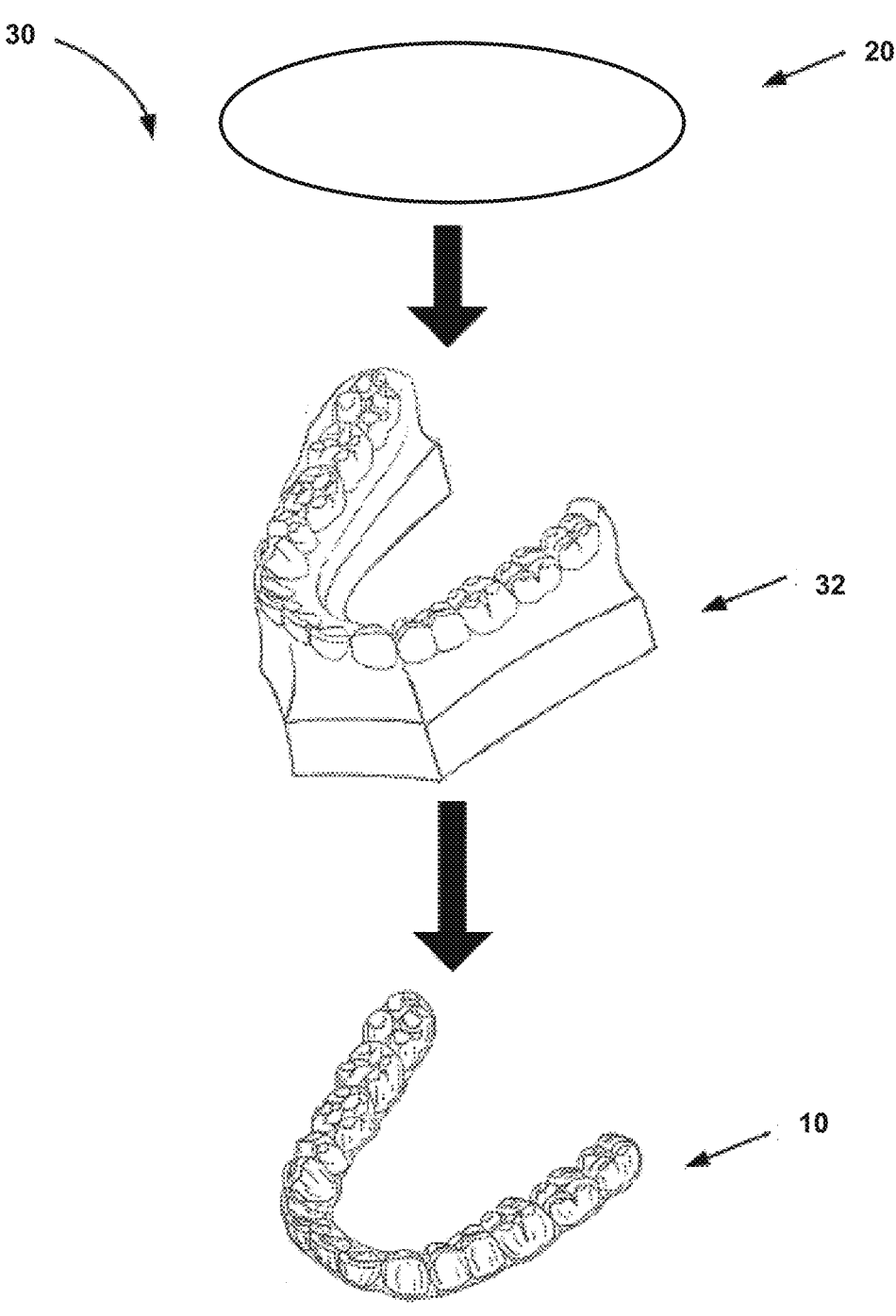
FIG. 3 is a perspective view of a process for molding an orthodontic appliance, according to some embodiments.

FIG. 3 depicts an example of process 30 for forming an orthodontic appliance. As shown, laminate material 20 can be formed into orthodontic appliance 10. In this example process, orthodontic appliance 10 can be produced with the use of physical tooth model, or mold, 32. In some embodiments, laminate material 20 is dimensioned (e.g., 120 mm and/or 125 mm diameter circle) for ready processing on a commercially available forming device (e.g., Erkoform®, Erkoform-3dmotion®, Biostar®, Ministar S®, Drufomat Scan®, Drufosmart®, Essix® SelectVac®). Guidelines for operating such forming devices can be found at Scheu Dental Technology, *Biostar Operating Manual*, DE/GB/FR/IT/ES/1.000/06/19 G REF PM 0113.01; Scheu Dental Technology, *Application booklet for the pressure moulding technique*, GB 2.000/07/19 G REF 0111.02; Erkodent, Thermoforming, S15-3106-48; Erkodent, *Erkoform* 3D, 61-8002-2; Erkodent, *Erkoform-3D+Instructions*, BA-Erkoform-3d+-anl-EN-04-04-2019, which are incorporated by reference herein.

Orthodontic appliance 10 can be produced by heating laminate material 20 and then vacuum or pressure forming the material over the teeth in the physical tooth model 32, and then trimming excess material after removal from the mold. Accordingly, orthodontic appliance 10 is a direct representation of physical tooth model 32.

In some embodiments, second layer 16 of laminate material 20 (e.g. thermoplastic copolyester (TPC/TPE-E) (e.g. Arnitel® EM400/460)) is provided in a crystalized form, such that it appears translucent or opaque prior to thermoforming. Some thermoplastic elastomers allow one to tune the amount of translucency according to the heating temperature and/or heating time. Thermoforming laminate material 20 for a sufficient amount of time can modify (i.e., decrystalize) the crystalline structure of second layer 16 to make it translucent, or at least more translucent than originally provided. The degree of translucence depends on the amount of time laminate material 20 is thermoformed and/or the temperature applied (i.e. thermoforming machine temperature setting) to laminate material, the thickness of second layer 16, and the thickness of first layer 14 and third layer 18.

It has been determined that heating times of 30-60 seconds using a Biostar thermoforming device (with thermoforming settings 6 bar/87 psi, 427° F.) on laminates with first layer 14 and third layer 18 ranging from 0.010-0.015 in. thick and second layer 16 being 0.010 in. thick provided a good translucency for orthodontic retainers resembling human teeth. The ability to tune translucence (for oral appliances using at least one thermoplastic elastomer layer) can be advantageous over appliances that use colorants such TiO2 or BaSO4 or using materials such as crystallized polyethylene and polypropylene, which, for the purposes of thermoforming an appliance, the degree of possible translucency or opaqueness are more or less set when such materials are formed.

In some embodiments, an oral appliance can be constructed from a laminate shaped to fit in a commercially available thermoforming device and has an optimal thickness of 0.020-0.045 inches (prior to thermoforming). In some embodiments, first layer 14 and third layer 18 can each be formed from a transparent copolyester (e.g., PETG such as Eastar™ copolyester 6763) having an optimal thickness of 0.005-0.020 inches (prior to thermoforming), and a second layer 16 being formed from a thermoplastic elastomer (e.g. TPC/TPE-E such as Arnitel® EM400) having an optimal thickness of 0.005-0.020 inches (prior to thermoforming).

Figure 4A:
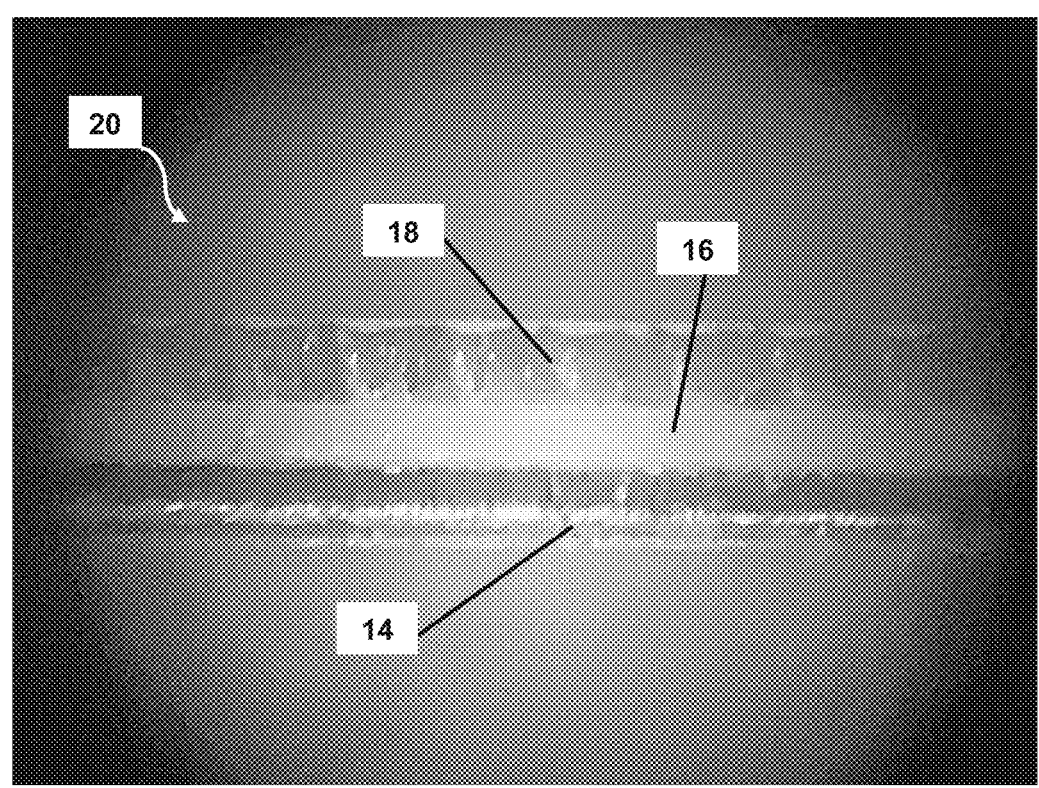
FIG. 4A is a photograph of a cross-section of a laminate material, according to some embodiments.
Figure 4B:
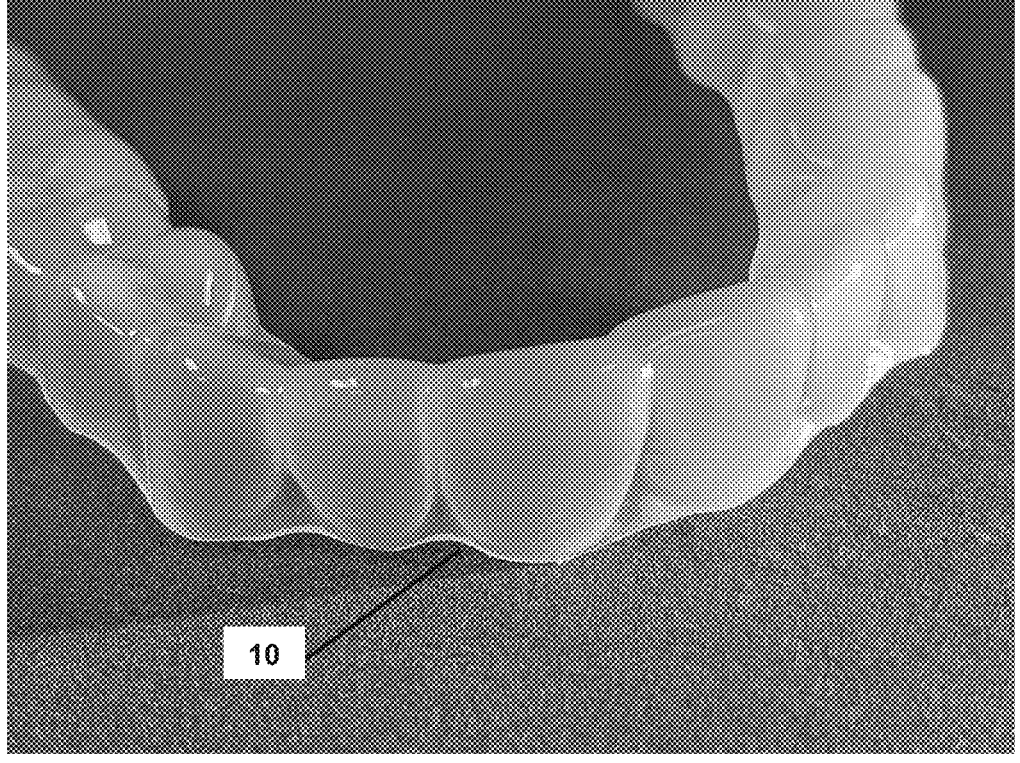
FIG. 4B is a photograph of the laminate material of FIG. 4A formed into an orthodontic appliance, according to some embodiments.

As shown in FIGS. 4A and 4B, in some embodiments, laminate material 20 can be thermoformed into a retainer 10 having an optimal thickness of 0.040 inches (prior to thermoforming), where first layer 14 and third layer 18 can each be formed from a transparent copolyester (e.g., PETG such as Eastar™ 6763) having an optimal thickness of 0.015 inches (prior to thermoforming), and a second layer 16 being formed from a thermoplastic copolyester (TPC/TPE-E) (e.g. Arnitel® EM400) having an optimal thickness of 0.010 inches (prior to thermoforming). As shown in the photograph of a cross-section of laminate material 20 at FIG. 4A, second layer 16 is opaque prior to thermoforming. Compare with retainer 10 of FIG. 4B, in which heating laminate material 20 during a thermoforming process causes second layer 16 to decrystallize to a degree from an opaque state to become translucent or have relatively greater transparency. As described above, the degree of crystallinity can be tuned to increase or decrease relative translucency of second layer 16 and hence retainer 10. It has been determined that using laminate material 20 with a commercially available Biostar® thermoforming device with a heating setting of 220° C./427° F., heating time of 45-50 seconds, and cooling time of 100-140 seconds or 120 seconds provides the level of translucency (or closely similar) of retainer 10 shown at FIG. 4B. Increasing the heating time will provide greater transparency for retainer 10 via greater relative decrystallization of second layer 16, and conversely decreasing the heating time will provide less transparency for retainer 10 via less relative decrystallization of second layer 16. In some embodiments, the laminate can be thermoformed into an aligner having an optimal thickness of 0.030 inches (prior to thermoforming), where first layer 14 and third layer can each being formed from a transparent copolyester (e.g., Eastar™ copolyester 6763) having an optimal thickness of 0.010 inches (prior to thermoforming), and a second layer 16 being formed from a thermoplastic copolyester (e.g. Arnitel® EM400) having an optimal thickness of 0.010 inches (prior to thermoforming).

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. A method for forming an orthodontic appliance to have a color and gloss resembling natural teeth, the method comprising:

placing a laminate material into an orthodontic appliance thermoforming device, wherein, before thermoforming, the laminate material comprises:

a first layer comprising a first thermoplastic material having a transparent appearance;

a second layer comprising a second thermoplastic material, the second thermoplastic material having a non-transparent appearance; and a third layer comprising the first thermoplastic material, wherein the second layer is between the first and third layer;

determining a target degree of translucence of the orthodontic appliance to resemble a color and gloss of natural teeth;

selecting thicknesses of the first, second, and third layers;

thermoforming the laminate material into the orthodontic appliance according to pressure, heating, and time settings of the orthodontic appliance thermoforming device, wherein the thicknesses of the first, second, and third layers, as well as at least the heating and time settings, are selected to tune translucence of the orthodontic appliance to the target degree of translucence to resemble a color and gloss of natural teeth, wherein the thicknesses of the first, second, and third layers are selected to mitigate gloss to resemble the gloss of natural teeth, wherein the first thermoplastic material of the first and third layers is a transparent copolyester and the second thermoplastic material of the second layer is a thermoplastic copolyester that is opaque prior to thermoforming, wherein the thermoforming causes the second thermoplastic material to increase in relative decrystallization with increased heating time and thereby increase relative translucency and relative transparency of the second layer; and wherein the heating and time settings are selected to tune a translucence appearance of the second layer by increasing the relative decrystallization of the second layer such that the second thermoplastic material of the orthodontic appliance transitions during thermoforming from the non-transparent appearance to a translucent appearance that provides the target degree of translucence to resemble a color and gloss of natural teeth.

2. The method of claim 1, wherein the second thermoplastic material is crystallized, and wherein at least the heating and time settings are selected to at least partially decrystallize the second thermoplastic material of the second layer to provide the translucent appearance.

3. The method of claim 1, wherein increasing an amount of heat energy applied to the laminate material and/or increasing the amount of time the laminate material is heated causes the second thermoplastic material to have greater relative translucency.

4. The method of claim 1, wherein the heating settings comprises 220° C. (427° F.).

5. The method of claim 1, wherein the time setting comprises a heating time of 30-60 seconds.

6. The method of claim 1, wherein the second thermoplastic material comprises a thermoplastic copolyester.

7. The method of claim 1, wherein a relative degree of translucency of the second thermoplastic material of the orthodontic appliance is based on a degree of a structure of the second thermoplastic material being crystallized.

8. The method of claim 1, wherein the second thermoplastic material is configured to decrystallize when being thermoformed by the commercially available thermoforming device at a heat setting of 220° C.

9. The method of claim 1, wherein the orthodontic appliance has a hazed white appearance resulting from the at least the heating and time settings that are selected to tune translucence of the orthodontic appliance to the target degree of translucence by making the second thermoplastic material of the orthodontic appliance transition from the non-transparent appearance to a translucent appearance of the target degree of translucence, wherein the orthodontic appliance is absent colorants for providing the target degree of translucence.

10. The method of claim 1, wherein the orthodontic appliance has a milky appearance resulting from the at least the heating and time settings that are selected to tune translucence of the orthodontic appliance to the target degree of translucence by making the second thermoplastic material of the orthodontic appliance transition from the non-transparent appearance to a translucent appearance of the target degree of translucence, wherein the orthodontic appliance is absent colorants for providing the target degree of translucence.

11. The method of claim 1, wherein the second thermoplastic material of the second layer of the orthodontic appliance comprises a structure arranged to scatter light to reduce perceived visual gloss effects from a perspective of a viewer of the orthodontic appliance, wherein the structure results from the at least the heating and time settings that are selected to tune translucence of the orthodontic appliance to the target degree of translucence by making the second thermoplastic material of the orthodontic appliance transition from the non-transparent appearance to a translucent appearance of the target degree of translucence, wherein the orthodontic appliance is absent colorants for providing the target degree of translucence.

12. The method of claim 1, wherein the laminate has a thickness of 0.030 inches prior to thermoforming, wherein the first layer and the third layer are formed from a transparent copolyester having a thickness of 0.010 inches prior to thermoforming, and wherein the second layer is formed from a thermoplastic copolyester having a thickness of 0.010 inches prior to thermoforming.

13. The method of claim 1, wherein the selected heating and time settings comprises a heating time within 30-60 seconds.

14. The method of claim 13, wherein the selected thicknesses of the first and third layers are 0.010-0.015 inches, and the selected thickness of the second layer is 0.010 inches.

15. The method of claim 13, wherein the selected heating and time settings comprises a heating temperature of approximately 427 degrees Fahrenheit.

16. The method of claim 15, wherein the selected heating and time settings comprises a cooling time of 100-140 seconds.

17. The method of claim 1, wherein the second thermoplastic material of the second layer consists of a thermoplastic copolyester (TPC/TPE-E) and the first thermoplastic material of the first and third layers consist of a transparent polyethylene terephthalate glycol-modified (PETG).

18. The method of claim 17, wherein the selected heating and time settings comprises a heating temperature of approximately 427 degrees Fahrenheit, and wherein the selected heating and time settings comprises a heating time within 45-50 seconds and a cooling time of 100-140 seconds.

19. The method of claim 18, wherein the laminate has a thickness of 0.040 inches prior to thermoforming, wherein the selected thicknesses of the first and third layers are 0.015 inches, and the selected thickness of the second layer is 0.010 inches.

* * * * *